(12) United States Patent
Vakrat et al.

(10) Patent No.: US 8,824,831 B2
(45) Date of Patent: Sep. 2, 2014

(54) ADVANCED NOISE REDUCTION IN DIGITAL CAMERAS

(75) Inventors: Dudi Vakrat, Nethanya (IL); Noam Korem, Timrat (IL); Victor Pinto, Zychron-Yaakov (IL)

(73) Assignee: Qualcomm Technologies, Inc., San Diego, CA (US)

( * ) Notice: Subject to any disclaimer, the term of this patent is extended or adjusted under 35 U.S.C. 154(b) by 479 days.

(21) Appl. No.: 13/231,060

(22) Filed: Sep. 13, 2011

(65) Prior Publication Data

US 2011/0317045 A1    Dec. 29, 2011

Related U.S. Application Data

(63) Continuation-in-part of application No. 13/160,775, filed on Jun. 15, 2011, now abandoned, which is a continuation of application No. 11/754,202, filed on May 25, 2007, now Pat. No. 7,983,503.

(51) Int. Cl.
*G06K 9/40* (2006.01)

(52) U.S. Cl.
USPC ............................. 382/275; 348/241; 348/607

(58) Field of Classification Search
USPC .................. 382/263, 275; 348/241, 607, 609
See application file for complete search history.

(56) References Cited

U.S. PATENT DOCUMENTS

| | | | |
|---|---|---|---|
| 5,148,488 A * | 9/1992 | Chen et al. .................... | 704/219 |
| 5,311,181 A * | 5/1994 | Ferguson et al. ............. | 341/143 |
| 5,325,204 A * | 6/1994 | Scarpa .......................... | 348/607 |
| 5,461,655 A | 10/1995 | Vuylsteke et al. | |
| 5,909,516 A * | 6/1999 | Lubin .......................... | 382/260 |
| 5,991,457 A | 11/1999 | Ito et al. | |
| 6,304,608 B1 | 10/2001 | Chen et al. | |
| 6,580,835 B1 | 6/2003 | Gallagher et al. | |
| 6,625,325 B2 | 9/2003 | Gindele et al. | |
| 6,681,054 B1 | 1/2004 | Gindele | |
| 6,718,068 B1 | 4/2004 | Gindele et al. | |
| 6,724,943 B2 * | 4/2004 | Tsuchiya et al. ............. | 382/261 |
| 6,738,494 B1 | 5/2004 | Savakis et al. | |
| 6,804,393 B2 | 10/2004 | Gindele et al. | |
| 6,807,300 B1 | 10/2004 | Gindele et al. | |
| 6,813,389 B1 | 11/2004 | Gindele et al. | |
| 6,856,704 B1 | 2/2005 | Gallagher et al. | |
| 6,931,160 B2 | 8/2005 | Gindele et al. | |
| 6,937,772 B2 | 8/2005 | Gindele | |

(Continued)

OTHER PUBLICATIONS

Lee, "Digital Image Smoothing and the Sigma Filter," Computer Vision Graphics, and Image Processing, vol. 24, pp. 256-269 (1983).

(Continued)

*Primary Examiner* — Aaron W Carter
(74) *Attorney, Agent, or Firm* — Knobbe Martens Olson & Bear LLP

(57) ABSTRACT

A noise reduction apparatus for digital cameras is presented that includes groups of one or more connected non-linear filter units. Each of the filter unit groups are driven by decimated input image data at a different level of decimation and the output of at least one of these filter unit groups serves as one of a plurality of inputs to another filter unit group driven at a different decimation level. Filtered image data from one or more filter unit groups is adaptively combined in response to one or more image metrics related to one or more local regional image characteristics.

34 Claims, 3 Drawing Sheets

(56) References Cited

U.S. PATENT DOCUMENTS

| | | |
|---|---|---|
| 6,937,775 B2 | 8/2005 | Gindele et al. |
| 7,054,501 B1 | 5/2006 | Gindele et al. |
| 7,065,255 B2 | 6/2006 | Chen et al. |
| 7,092,579 B2 | 8/2006 | Serrano et al. |
| 7,116,838 B2 | 10/2006 | Gindele et al. |
| 7,181,086 B2 | 2/2007 | Gindele et al. |
| 7,257,271 B2 | 8/2007 | Adams, Jr. et al. |
| 7,262,726 B2 * | 8/2007 | Schreier et al. .......... 341/143 |
| 7,769,089 B1 * | 8/2010 | Chou .................. 375/240.29 |
| 7,778,478 B2 * | 8/2010 | Kuniba ..................... 382/254 |
| 7,808,557 B2 * | 10/2010 | Hall ........................ 348/607 |
| 7,899,267 B2 * | 3/2011 | Dvir ........................ 382/274 |
| 7,983,503 B2 | 7/2011 | Vakrat et al. |
| 8,064,699 B2 * | 11/2011 | Hemmert et al. ......... 382/181 |
| 8,102,444 B2 * | 1/2012 | Vakrat et al. ............. 348/245 |
| 8,238,683 B2 * | 8/2012 | Ishiga ....................... 382/260 |
| 8,289,451 B2 * | 10/2012 | Hall ........................ 348/607 |
| 2001/0038716 A1 * | 11/2001 | Tsuchiya et al. ......... 382/261 |
| 2002/0118887 A1 | 8/2002 | Gindele |
| 2006/0114479 A1 | 6/2006 | John |
| 2007/0296869 A1 * | 12/2007 | Hall ........................ 348/685 |
| 2008/0025628 A1 | 1/2008 | De Haan |
| 2008/0291330 A1 * | 11/2008 | Vakrat et al. ............. 348/607 |
| 2009/0097732 A1 * | 4/2009 | Bohm et al. .............. 382/132 |
| 2009/0247108 A1 * | 10/2009 | Yamajo et al. ............ 455/307 |
| 2010/0310143 A1 * | 12/2010 | Rao et al. ................. 382/131 |

OTHER PUBLICATIONS

Non-Final Office Action Mailed Jul. 29, 2010 in Co-Pending U.S. Appl. No. 11/754,202, filed May 25, 2007.

Final Office Action Mailed Jan. 5, 2011 in Co-Pending U.S. Appl. No. 11/754,202, filed May 25, 2007.

Notice of Allowance Mailed Mar. 23, 2011 in Co-Pending U.S. Appl. No. 11/754,202, filed May 25, 2007.

Non-Final Office Action Mailed Dec. 15, 2011 in Co-Pending U.S. Appl. No. 13/160,775 of Vakrat, D., et al., filed Jun. 15, 2011.

* cited by examiner

ADVANCED NOISE REDUCTION IN DIGITAL CAMERAS

CROSS-REFERENCE TO RELATED APPLICATIONS

This is a continuation-in-part of U.S. patent application Ser. No. 13/160,775, filed on Jun. 15, 2011 (abandoned), which is a continuation of U.S. patent application Ser. No. 11/754,202, filed on May 25, 2007 (now U.S. Pat. No. 7,983,503), which are incorporated herein by reference.

BACKGROUND

This application relates to image processing in digital cameras and other electronic digital image acquisition devices, and particularly to techniques for improving noise reduction techniques for such images.

Images obtained by digital cameras and other imaging systems contain random noise, which typically grows stronger as the ISO sensitivity grows higher. Noise reduction in digital cameras is becoming increasingly important and problematic because of several trends in the digital camera market which result in lower Signal to Noise Ratios (SNR), including the increasing of sensor resolution by reducing the pixel size and the providing better image quality at higher ISO sensitivities, which enables capture of images in low light conditions.

Prior art approaches typically effect noise reduction by either applying edge preserving filters on the image or suppressing chromatic components. Applying edge-preserving filters on the image, such as median filters, bilateral filters and others, are well known in the art. The difficulty encountered with these methods is that the size of the filter required for an effective noise reduction grows in proportion to the amount of noise in the image. However, the size of the filters is usually limited in order to save hardware costs, and software implementations tend to incur too much time and processing power to be practical. Suppressing the chromatic components of the pixels to zero in dark or gray areas reduces the chromatic component of the noise in these areas. The difficulty encountered using this method is that it affects only dark/gray areas, and it is also very likely to suppress real colors in the image. A seminal article on aspects of noise reduction in imagery and using sigma filters for this purpose is given in "Digital Image Smoothing and the Sigma Filter", Lee, J. S., *Computer Vision, Graphics, and Image Processing*, 24, 255-269, 1983.

These various prior art methods tend to have a number of shortcomings when it comes to implementation in digital cameras, video, and other imaging systems. There will always be noise when an image is captured in low light conditions. The noise level will increase as the sensor pixel size is decreased due to sensor resolution issues and due to a trend to reduce sensor cost. Therefore, there is substantial room for improvements in digital imaging systems, even when considering future changes in the application environment.

SUMMARY

The described methods and corresponding apparatus provide ways to achieve superior image quality as compared to previous noise reduction approaches. A noise reduction apparatus is presented that includes groups of one or more serially connected non-linear filter unit groups. Each of the filter unit groups are driven by decimated input image data at a different level of decimation and the output of at least one of these groups serves as one of a plurality of inputs to another group driven at a different decimation level.

Various aspects, advantages, features and embodiments of the present invention are included in the following description of illustrative examples thereof, which description should be taken in conjunction with the accompanying drawings. To the extent of any inconsistency or conflict in the definition or use of terms between any of the patents, patent applications, articles, other publications, documents and things referenced herein, those of the present application shall prevail.

DETAILED DESCRIPTION OF ILLUSTRATIVE EMBODIMENTS

Overview

Figure 1:
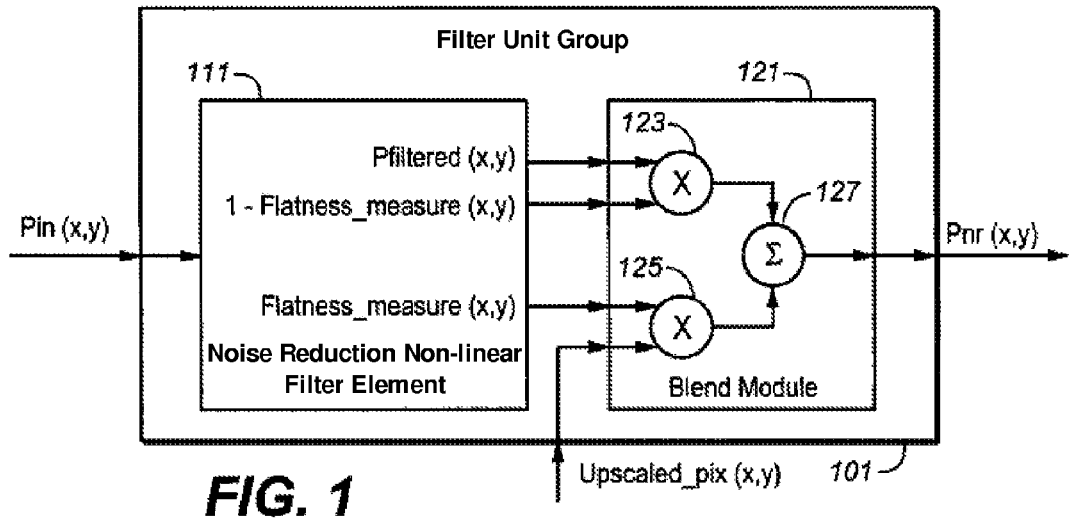
FIG. 1 illustrates an example of a filter unit group of the present invention.

In order to achieve the desired results, illustrative embodiments described herein employ a plurality of small noise reduction non-linear filters working on decimated (downscaled) representations of the image being acquired and performing in concert to achieve performance equivalent to a much larger filter. These offer a comprehensive solution, which can be implemented in hardware (HW) in the illustrative embodiments, and which includes decimation along with small size non-linear low pass filters. The results obtained can achieve quality such as that obtained by applying a much larger filter, with only a minor penalty in motion image frame rate performance or silicon area.

The illustrative embodiments provide a comprehensive solution for digital cameras, video, and imaging systems that provides effective noise reduction in an image acquired using a high gain analog signal path between the imaging system's sensor and its analog to digital (A/D) converter. Images acquired under these conditions are often call "high ISO images". In this imaging environment, the various aspects presented in the following provide results equivalent in quality to those achieved by very large noise reduction filters, without the cost in frame-rate and/or DRAM-bandwidth that is usually incurred when such filters are employed.

A particular advance in the state of the art can be stated as the technique of using an array of filters (of any appropriate type), at various levels of decimation (downscaling to lower resolution), and the use of adaptive combining of filtered image data, dependent on one or more image metrics related to one or more local regional image characteristics. For example, this combining operation could be a blending operation that is responsive to a flatness measure. One such flatness measure could be the spatial uniformity of the local region of the image being processed. A second could be the chromaticity uniformity of the local region of the image being processed.

These techniques provide effective noise removal and higher image quality for high ISO images, with minor costs in required hardware, frame rates and DRAM bandwidth. It allows the use of sensors and/or an analog front end with lower SNR qualities, such as CMOS sensors, or sensors with higher resolution and smaller pixel size. Further, it allows further increase in the ISO sensitivities in camera products, and increases the ability of cameras to capture images in low light conditions.

Illustrative Filter Arrangements

The described techniques are based on successive decimation of the neighborhood of the current pixel, edge preserving (or, more generally, non-linear) filtration of the decimated pixel data, and interpolation and blending of the various decimated image data to achieve superior noise reduction without incurring excessive cost in terms of hardware, processing power or time. The implementation described here is based on a hardware solution; however, it will be clear to one skilled in the art that the same concepts can be implemented in software, firmware, or a combination of these running on an appropriate signal processor, with associated memory and peripheral hardware.

A basic component of the described noise reduction system is the "Filter Unit Group". This component is shown in FIG. 1 as block 101. Filter unit groups are connected together to form the array of filters, previously discussed. In its simplest form, a filter unit group includes two modules: a Noise Reduction Non-linear Filter Element 111, and a Blend Module 121. The Noise Reduction Non-linear Filter Element 111 selectively removes noise from the image while substantially preserving the edge detail in the image. Additionally, the filter creates one or more metrics that provide an indication of one or more local regional image data characteristics. For example, one such metric may be "flatness_measure(x,y)" of FIG. 1, which is a measure of the spatial uniformity of the local region of the image data being processed. Another may be a Dynamic Range Compensation (DRC) gain factor, which is a measure of the visibility of each pixel, as compared to neighboring pixels, in the local region of the image data being processed. Such a gain factor is described, for example, in issued U.S. Pat. No. 7,899,267 entitled "Dynamic range compensation by filter cascade" by Itsik Dvir issued Mar. 1, 2011, which is incorporated herein by reference, particularly (but not exclusively) column 2 lines 7-31, column 2 lines 59-67, column 3 lines 1-19, column 3 lines 31-51, column 4 lines 9-24 and FIG. 2. A third such metric may be a measure of the chromaticity of each pixel in the local region of the image data being processed. A fourth may be a measure of the chromaticity uniformity of each pixel in the local region of the image data being processed. In response to one or more of these metrics, the Blend Module 121 melds (at 127) the current noise filtered pixel with image data impressed on its secondary input (at the bottom of the module, labeled 'upscaled_pix (x,y)'). The described illustrative embodiment of the present invention's blend module employs a single flatness measure metric, and forms a linear combination weighted (at 123 and 125) by the "flatness_measure(x,y)". The operation of an illustrative Noise Reduction Non-linear Filter Element is described in greater detail later in this discussion. Those skilled in the art will recognize that in the illustrative embodiment any Noise Reduction Non-Linear Filter Element 111 that preserves edges and also provides a suitable metric of local image uniformity may be used in place of the filter describe herein. Further, it will be readily recognized by those skilled in the art that metric creation operations can be separated from noise reduction non-linear filtering operations, thus allowing one or more separate metric creation modules to be included in a filter unit group, along with a dedicated noise reduction non-linear filter element.

At each pixel location in the image, the current pixel is cleansed of noise by examination and processing of the current region's pixel data (neighborhood). The neighborhood is defined in the illustrative embodiments as the pixels in an N×N square of data surrounding the current pixel, where N is a small odd integer (five, for example).

The enhanced noise reduction operation of the system is achieved by configuring a plurality of filter unit groups, using decimation (downscaling), filtering, interpolation (upscaling) of the filtered pixel data and blending the upscaled data with higher resolution data. Several configurations are possible, with some examples described with respect to FIGS. 2-4.

Figure 2:
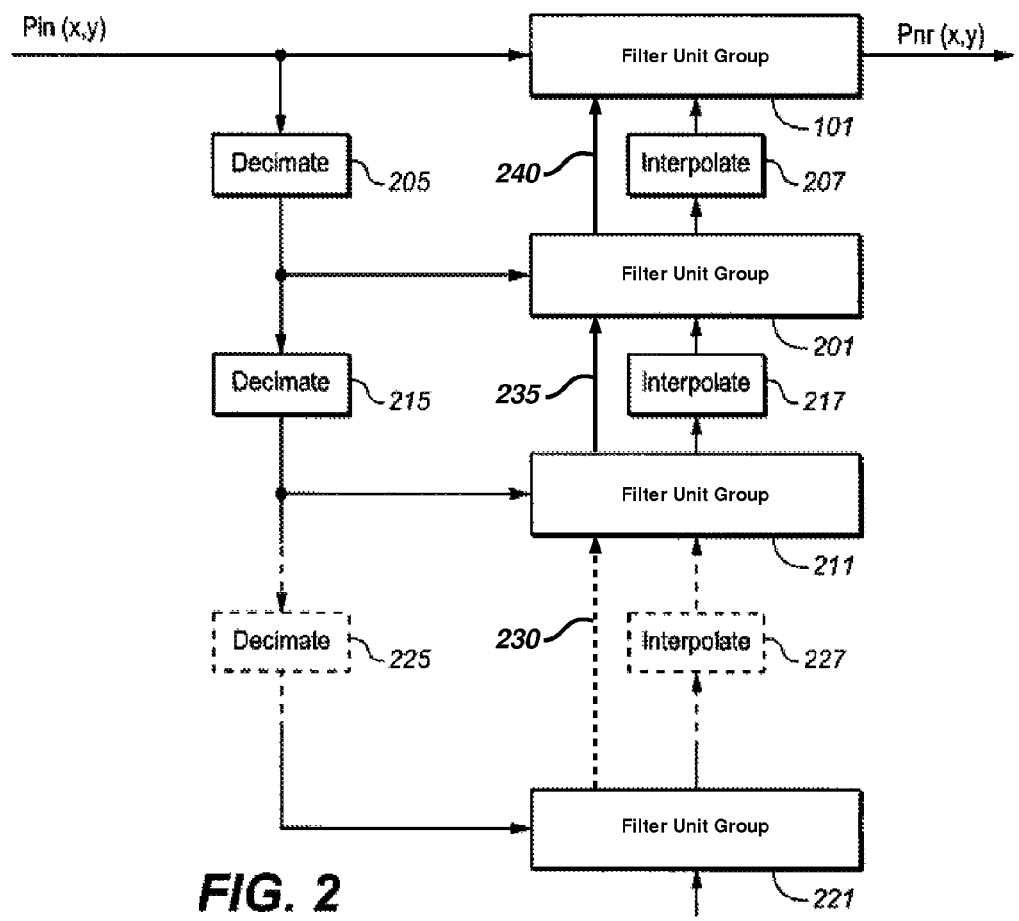
FIG. 2 is a block diagram of one configuration ("increasing depth" mode) of filter unit groups.

FIG. 2 details one such configuration, dubbed "Increasing Depth" mode here. In this mode, the full scale pixel data is decimated to several lower levels of resolution, by decimate blocks 205, 215, and 225. At each level, the decimated data is filtered, and then selectively blended, by filter unit groups 101, 201, and 211, with upscaled data output from interpolate blocks 207, 217, and 227. Immediately lower resolution output from filter unit groups 201, 211 and 221 drive interpolate blocks 207, 217, and 227 respectively. The non-linear filter elements of filter unit groups 101, 201, 211, and 221, shown in FIG. 2 as processing increasingly lower resolution image data, can all employ the same filtering algorithm to effect noise reduction. However, they can also employ different filtering algorithms based upon various criteria. One such criteria could be the resolution of the image data being processed. For example, the effectiveness of the non-linear filter element incorporated in filter unit group 221, which operates on image data that has been decimated to the lowest level of image resolution depicted in FIG. 2, may be improved by taking into account the lower resolution level of the image data being processed. The blending processes employed by filter unit groups 101, 201, 211, and 221 are responsive to a metric that indicates a local regional image data characteristic. One such metric may be an indication of the uniformity of a local region of the image data being processed. This metric provides a measure of the degree of edge activity detected at each resolution level and thus can be employed by the blending process to prevent edges from losing sharpness. Any number of resolution levels can be used as indicated by the dotted line extensions. The number of resolution levels will be limited by the size of the image and the amount of scaling between one resolution level and the next. (Additional detail on upscaling and downscaling can be found, for example, in U.S. Pat. No. 6,937,772, which employs a differing filtering arrangement.) The amount of upscaling at a given level's interpolation will typically be the same as the amount of downscaling at that level's decimation.

The configuration shown in FIG. 2 can pass metrics from one filter unit group at one downscaling level, to a second filter unit group at a different downscaling level, in order to improve the filtering capabilities of the second filter unit group. For example, if a filter unit group is operating at a downscaling level of 1:2, such as Filter Unit Group 201. and another filter unit group is operating at a downscaling level of 1:4, such as Filter Unit Group 211, a flatness measure, or one or more other metrics, calculated in Filter Unit Group 211 can be passed to Filter Unit Group 201 over line 235. Filter Unit Group 201 can then consider the metrics provided by Filter Unit Group 211 when performing filtering and calculation of its own metrics. Similarly, metrics created in Filter Unit Group 201 can be passed to a 1:1 filter unit group, such as Filter Unit Group 101, over line 240, making it possible for Filter Unit Group 101 to consider metrics provided by Filter Unit Group 201 when performing filtering and calculation of its metrics. When passing metrics created in a filter unit group at one downscaling level to a filter unit group at a different downscaling level, it may be necessary to scale the metrics to the downscaling level of the receiving filter unit group in order for the metrics to be used. The need to scale the metric will depend on the nature of the metric being passed and how the receiving filter unit group employs the metric in its processing operations.

Figure 3:
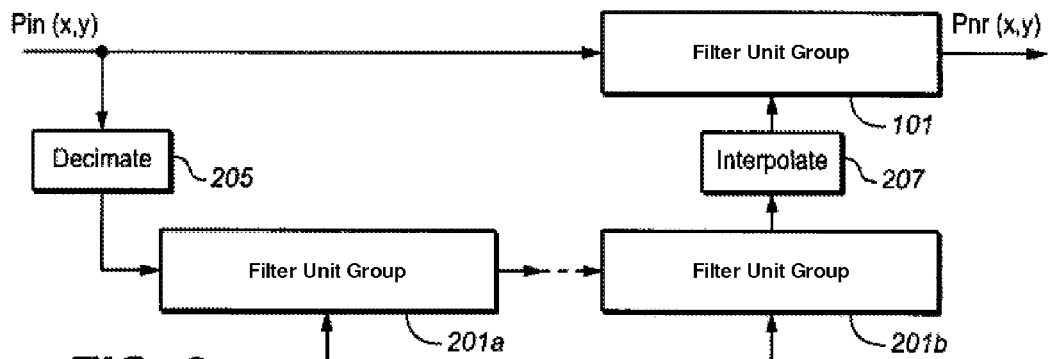
FIG. 3 is a block diagram of a second configuration ("increasing width" mode) of filter unit groups.

FIG. 3 details another possible configuration, dubbed "Increasing Width" mode here. In "Increasing Width" mode processing, the upscaled_pix(x,y) input to the filter unit groups of the bottom row are unused and unconnected. Therefore, no blending is performed along the bottom row, with only the Noise Reduction Non-linear Filter Element portion of the filter unit groups being used. The width mode may have any number of instances of filter unit groups in series. FIG. 3 shows two such Filter Unit Groups, 201a and 201b, where any additional filter unit groups would be placed in between. The first of these, 201a, receives the input decimated at 205 and the last (or, here second) Filter Unit Group 201b then has its output upscaled at 207 to serve as the second input of the top layer Filter Unit Group 101. Because the noise reduction non-linear filter elements are edge preserving, repeated applications of the same filter on the same data set will provide more and more refined estimates of the noise free value of the current pixel. Note that as the edge preserving filter stages are non-linear, using multiple such filters serially will act differently than just a single such stage with more aggressive filtering.

Figure 4:
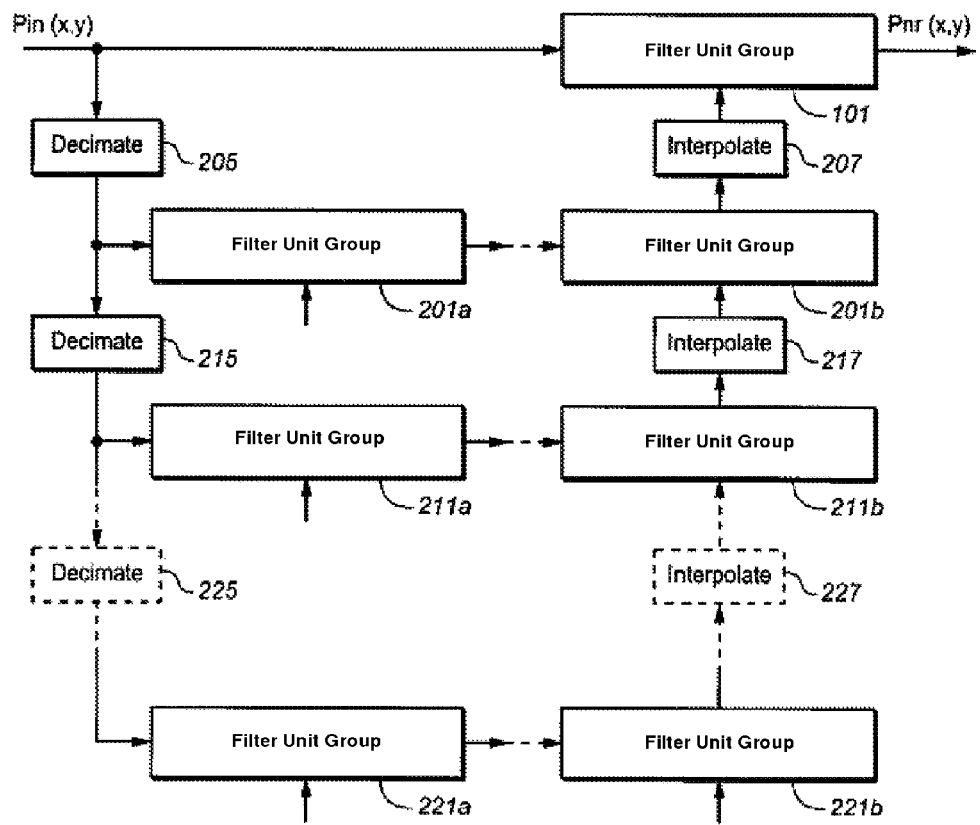
FIG. 4 shows a generalized filter array combining the width and depth modes.

The system can use both "Width" and "Depth" modes simultaneously, as diagrammed in FIG. 4. In this approach, filter unit groups are connected as an array with a depth of several rows, where each row uses the "width" mode arrangement. The first row, operating at a 1:1 downscaling level, is shown in FIG. 4 as having only one filter unit group, but it may also employ an array of filter unit groups in a width mode arrangement. (In FIG. 4, as well as in the other figures, the arrangement of filter unit groups is a schematic to show the functional relationships among the various system components, whether these are implemented in software or hardware. Thus, in a hardware or software implementation, the various components need not be physically arranged as shown.) In the illustrated embodiment, several levels of decimation are provided, which, at each level, are subjected to noise reduction non-linear filters without blending ("Width" mode processing), after which upscaled versions of the resulting image data are blended with the immediately higher resolution image data ("Depth" mode processing). Each level has multiple filter unit groups (201i, 211i, 221i) connected in series, where the first of the series receives input decimated (at 205, 215, 225) with respect to the level above, and supplies the output of the last of the series (interpolated at 207, 217, 227) to the last of the series in the level above. This matrix of filters is limited only by the size of the neighborhood considered, and the processing power and time available. Although the illustrative embodiment shows the same number of filter unit groups in each row, after the first single filter row, more generally this need not be the case.

Consequently, it can be seen that the present invention is comprised of an aggregation of one or more filter unit groups connected serially, with each of these aggregates being driven by input image data decimated to a different level of downscaling. One or more of the outputs of at least one of the filter unit groups of a first aggregate, may then serve as one or more inputs to at least one of the filter unit groups of a second aggregate at a different decimation level.

Filter Unit Group Operation

For each Input Image pixel in x,y coordinates, Pin(x,y), an illustrative embodiment of the filter unit group performs a series of operations. The first of these is using input image pixels in an N×N environment around Pin(x,y) to perform edge preserving low pass filtering. The result is Pin_filtered (x,y). N is typically a small integer number. The pseudo-code description below gives the operation of an illustrative filter.

Also using the input image in an N×N environment around Pin(x,y), the uniformity metric which indicates the flatness of the environment around Pin(x,y) is calculated. The result is Flatness_measure(x,y). N is typically a small odd integer number (five, for example).

In the instance that the filter unit group also receives an up-scaled decimated image ("Depth" mode operation), the module blends Pin_filtered(x,y) with the equivalent pixel from the upscaled decimated image, Upscaled_pix(x,y), according to the uniformity metric, Flatness_measure(x,y), to get the Output Image pixel, Pout(x,y):

$$Pout(x,y)=Flatness\_measure(x,y)*Upscaled\_pix(x,y)+ (1-Flatness\_measure(x,y))*Pin\_filtered(x,y)$$

Flatness_measure(x,y) is a value within the range of [0,1]. Around edges it tends toward 0, resulting in milder filtering. In flat areas of the Input Image, it is pushed towards higher values closer to 1, resulting in more aggressive filtering.

An Illustrative Filter Unit Group

This section presents a pseudo-code description of the operation of an illustrative non linear filter element. The filter described is of the class of sigma filters, however, those skilled in the art will recognize that any noise reducing filter that also provides an estimate of the local region's spatial uniformity may be used for this function.

In this description, the constant "T" is a threshold that indicates the noise levels of the camera's sensor and changes according to the ISO sensitivity for each possible shutter setting. For a given camera and a given ISO setting, the camera manufacturer can calculate T by, for example, capturing a color chart and then determining the maximum value of abs(Pin[x,y]−Pin[x+n,y+m]) over all the flat areas in the image (areas without edges or transitions).

In order to execute an N×N filter (where N is an odd integer) on each input image pixel in the stream Pin(x,y), an illustrative embodiment performs the following:

```
{
    Sum[x,y] = 0
    Count[x,y] = 0
    for (m= -(N-1)/2; m<=(N-1)/2;m++)
    {
        for (n= -(N-1)/2; n<+ (N-1);n++)
        {
            if (abs(Pin[x,y] − Pin[x+n,y+m]) < T)
            {
                Sum[x,y] = Sum[x,y] + Pin[x+n,y+m]
                Count[x,y] = Count[x,y] + 1
            }
        }
    }
    If (filtering is performed)
        Pin_filtered[x,y] = Sum[x,y]/Count[x,y]
    Else
        Pin_filtered[x,y] = Pin[x,y]
    Flatness_measure[x,y] = Count[x,y]/(N²)
    If (Flatness_measure[x,y] < A)
        Flatness_measure[x,y] = 0
    Else
        Flatness_measure[x,y] = (Flatness_measure[x,y]-A)/(1-A)
}
```

In the above pseudo-code, Parameter A is a threshold below which an area will be considered as not flat. This allows the flatness_measure to be assigned the value 0, preventing blending from being performed on edges. Such blending can damage the edges and cause the image to lose sharpness.

Implementation

In one illustrative embodiment of the invention, the matrix of filter/blend operations is achieved by successive iterations of a single filter unit group described above with respect to Figure I. In order to implement the generalized filter array described in FIG. 4 above, the system could proceed with the following sequence of actions:

Decimate the full-scale image successively to the depth of resolution desired, storing each decimated image individually.

Beginning at the lowest resolution, apply noise reduction successively, without the blending function ("Width" mode processing), to the desired number of iterations.

Upscale the current resolution to the next higher level and store it.

At the next higher resolution, apply noise reduction successively, without the blending function, to the desired number of iterations.

Blend the resulting image with the upscaled image from the next lower resolution level.

Repeat steps 3, 4, and 5 until a full-scale image is achieved.

Figure 5:
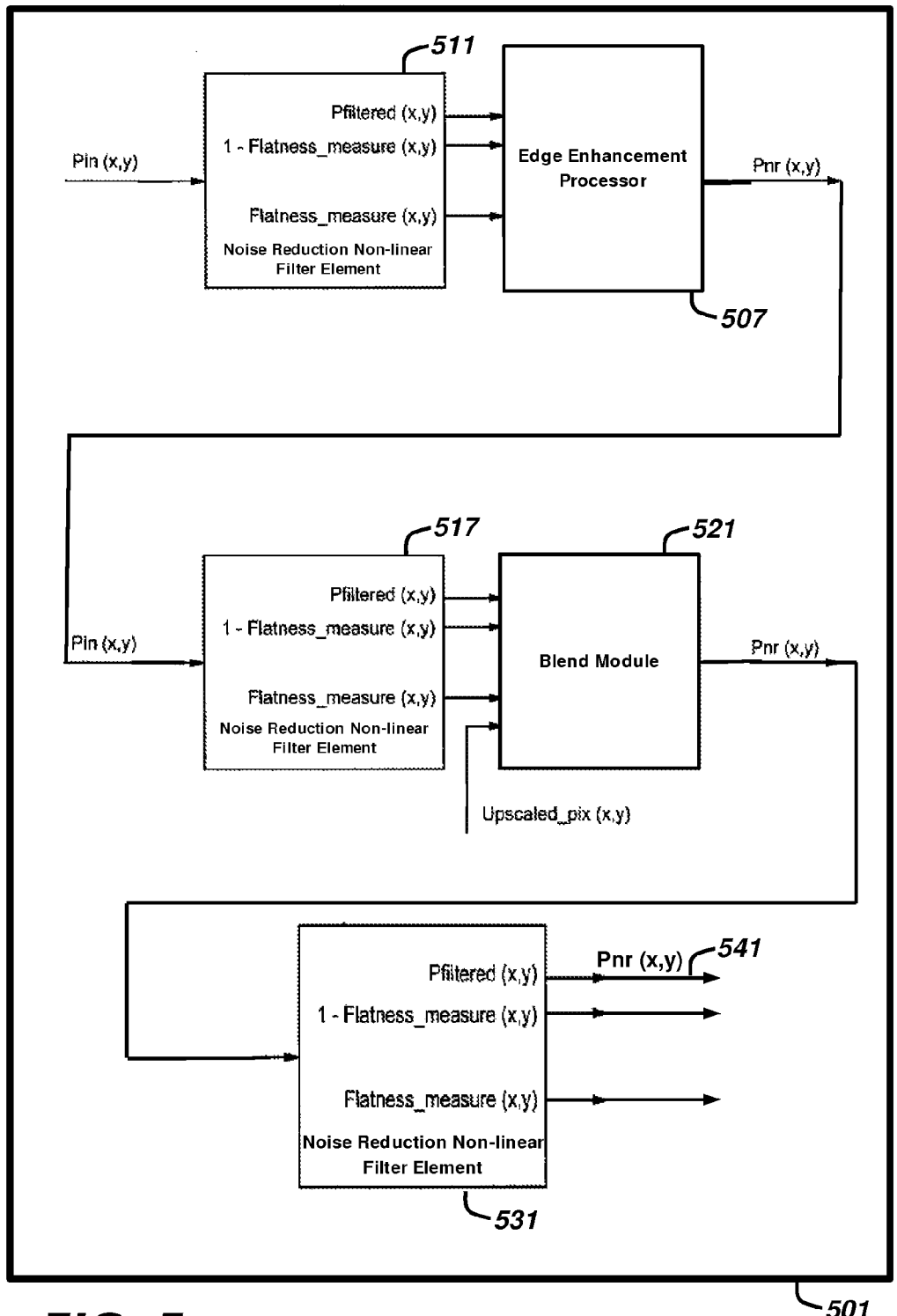
FIG. 5 illustrates an example of an extended filter unit group of the present invention.

As previously discussed, the basic component of the noise reduction system of the present invention is the filter unit group. It is shown in 101 of FIG. 1 as being comprised of two modules: The Noise Reduction Non-linear Filter Element 111, and a Blend Module 121. This structure may be extended by adding noise reduction filters, as well as other image processing modules after the blend module as well as before. The other image processing modules need not be directly related to a noise reduction function. In this extended configuration, it is the output of the final module or filter element in the series, after a blending operation, that drives a second filter unit group. In the previously discussed filter unit group configuration of FIG. 1, at least one metric is created by either one or more separate metric creation modules, or by the one or more non-linear filter elements. Recall that these metrics indicate at least one local regional input image data characteristic and are used by the filter unit group's blend module to improve the effectiveness of the blending operation. In the extended filter unit group configuration, these metrics can also be used by the other image processing modules as part of their processing operations to improve processing effectiveness. The other processing modules of the extended filter group configuration could be incorporated between a non-linear filter element and a blend module, before a non linear filter element, between a non-linear filter element and a second non-linear filter, or after a blend module. These processing modules may, for example, provide edge enhancement and/or color transformations. FIG. 5 illustrates one possible extended filter unit group configuration of the present invention. It is comprised of Edge Enhancement Processor 507, between two Noise Reduction Non-linear Filter Elements, 511 and 517, the output of Noise Reduction Non-linear Filter Element 517 driving Blend Module 521. Blend Module 521 is followed by a third Noise Reduction Non-linear Filter Element, 531. The output of Noise Reduction Non-linear Filter Element 531, appearing on line 541, may be input to a second filter unit group at a higher level of resolution, after the image data on line 541 is interpolated to the same level of resolution as the that used by the second filter unit group. Therefore, as one illustration, the image data on line 541 after interpolation may be used to drive the Upscaled_pix(x,y) input of FIG. 1, and be input to the filter blend module of Filter Unit Group 101, shown in FIGS. 1 and 2. In addition, the flatness measure metrics calculated in Noise Reduction Non-linear Filter Element 531, Flatness_measure(x,y) and 1−Flatness_measure (x,y), can be input over line 240 of FIG. 2, to Filter Unit Group 101, in order to improve the filtering properties of Filter Unit Group 101. In this illustration, the Filter Unit Group 201 of FIG. 2 is configured as an extended filter unit group whose image data output is interpolated to the same level of resolution as Filter Unit Group 101 by Interpolate Block 207. Filter Unit Group 101 can also be configured as an extended filter unit group. The structure of an extended version of Filter Unit Group 101 may be the same as the structure employed by extended Filter Unit Group 201, but this need not be the case. Filter Unit Group 101 may incorporate different image processing modules, or the same processing modules in a different order, after the blend module as well as before. In general, the processing elements employed by an extended filter group are not necessarily the same at each down scaling level, though they could be. Further, each of the extended filter unit groups connected serially to form an aggregate of extended filter unit groups at a particular down scale level need not employ the same processing elements, or order of processing elements, although they could.

The present invention is applicable to color image data. For color image data the noise reduction non-linear filter element of FIG. 1 would create at least one metric for each color or channel of the input image data. These metrics could also be created in one or more separate metric creation modules. The blend module would receive filtered image data from the non-linear filter element, at least one metric for each color or channel of the input image data, and image data output from a second filter unit group, and output a noise reduced combination image data output that is responsive to the metrics. In the case of color image data encoded in the Red, Green, and Blue (RGB) color image format, the noise reduction approach of the present invention would be applied separately to image data pixels of the same color. In the case of color imaged data encoded in the YUV color image format, the noise reduction approach of the present invention could likewise be applied to the color image data's luma channel (Y) and chroma channels (U,V) separately. However, for a color image encoded in the YUV color image format, the noise reduction approach of the present invention may be more effective if the noise reduction scheme applied to the chroma channels is dependent on the noise reduction scheme applied to the luma channel. This would mean that the noise filtering process and regional image metric calculation applied to U,V channels of image data are responsive to the noise filtering process and regional image metric calculation applied to the Y channel image data. This approach may improve the present invention's noise reduction processing effectiveness, however, it is not necessary for the proper operation of the present invention.

CONCLUSION

Although the various aspects of the present invention have been described with respect to illustrative embodiments thereof, it will be understood that the present invention is entitled to protection within the full scope of the appended claims.

What is claimed:
1. An image noise reduction apparatus comprising:
a plurality of filter unit groups, each of said plurality of filter unit groups configured to independently suppress noise in input image data; wherein a first filter unit group of the plurality of filter unit groups includes:
a noise reduction non-linear filter element to receive input image data and create filtered image data output;

a first metric creation module to receive input image data and create a first metric, said first metric indicating a first local regional input image data characteristic; and a blend module to receive the filtered image data, the first metric, and image data output from a second filter unit group of the plurality of filter unit groups, and output a noise reduced combination image data output, wherein the noise reduced combination image data output is responsive to the first metric.

2. The image noise reduction apparatus of claim 1 comprising a plurality of metric creation modules, including said first metric creation module, each to create a separate metric.

3. The image noise reduction apparatus of claim 1 wherein the first metric is an indication of the spatial uniformity of a local region of the input image data.

4. The image noise reduction apparatus of claim 1 wherein the first metric is an indication of the chromaticity of a local region of the input image data.

5. The image noise reduction apparatus of claim 1 wherein the first metric is an indication of the chromaticity uniformity of a local region of the input image data.

6. The image noise reduction apparatus of claim 1 wherein the first metric is an indication of pixel visibility in a local region of the input image data as is in the form of pixel by pixel gain factors.

7. The image noise reduction apparatus of claim 1 wherein the image data output of said second filter unit group is upscaled to a resolution that matches the resolution of the filtered image data.

8. The image noise reduction apparatus of claim 1 wherein the noise reduction non-linear filter element and the first metric creation module are combined in a single element.

9. The image noise reduction apparatus of claim 1 wherein the input image data and the image data from the second filter unit group is encoded in the red, green and blue color image format;

the noise reduction non-linear filter element processes the input image data of each color separately to output separate red, green, and blue filtered color image data;

the first metric creation module creates at least one metric for each color of the input image data; and the blend module respectively blends the filtered color image data with color image data from the second filter group in response to the at least one metric for each color, to create a noise reduced color combination image data output.

10. The image noise reduction apparatus of claim 1 wherein the input image data and the image data from the second filter unit group is encoded in the YUV color image format;

the noise reduction non-linear filter element processes the input image luma channel (Y) and chroma channels (U,V) data separately to output separate luma and chroma filtered image data;

the first metric creation module creates at least one metric for each channel of the input image data; and the blend module respectively blends the separate luma and chroma filtered image data with luma and chroma image data from the second filter group in response to the at least one metric for each channel, to create a noise reduced YUV color image format combination image data output.

11. The image noise reduction apparatus of claim 10 wherein the noise reduction process applied to the chroma channels of image data are dependent on the noise reduction process applied to the luma channel of image data.

12. The image noise reduction apparatus of claim 1 wherein a first aggregate of connected filter unit groups receives downscaled input image data at a different level of downscaling than a second aggregate of serially connected filter unit groups;

an output of said first aggregate serves as an input to said second aggregate, wherein the image data output of the first aggregate is upscaled to a resolution that matches the downscaling level of the second aggregate prior to being output to the second aggregate; and a metric is passed from said first aggregate to said second aggregate for use by a filter unit group of the second aggregate when the filter unit group of the second aggregate is performing filtering and metrics calculations.

13. The noise reduction apparatus of claim 1, wherein the non-linear filter elements of the filter unit groups are implemented in hardware.

14. The noise reduction apparatus of claim 1, wherein the non-linear filter elements of the filter unit groups are implemented in software.

15. The noise reduction apparatus of claim 1, wherein the non-linear filter elements of the filter unit groups use sigma class filters.

16. The noise reduction apparatus of claim 1, wherein the non-linear filter elements of the filter unit groups use the same filtering algorithm.

17. The noise reduction apparatus of claim 1, wherein the non-linear filter elements of the filter unit groups use different filtering algorithms.

18. The noise reduction apparatus of claim 1, wherein the input image data is image data from a digital camera.

19. The noise reduction apparatus of claim 1, wherein the input image data is image data from a video camera.

20. The image noise reduction apparatus of claim 1 wherein at least one of said plurality of filter unit groups includes a plurality of noise reduction non-linear filter elements.

21. The image noise reduction apparatus of claim 1 including at least one image processing module.

22. The image noise reduction apparatus of claim 21 wherein the image processing module is an edge enhancement processing module.

23. The image noise reduction apparatus of claim 21 wherein the image processing module is a color transformation processing module.

24. The image noise reduction apparatus of claim 21 wherein the image processing module uses a metric as part of its processing operation.

25. A method of performing a noise reduction operation on input image data, comprising:

independently generating a first noise reduced non-linear filtered image data output from the input image data;

generating a first metric indicating a first local regional characteristic of the input image data; and blending the first noise reduced non-linear filtered image data with independently generated second noise reduced non-linear filtered image data in response to the first metric.

26. The noise reduction method of claim 25 wherein a plurality of metrics are generated, including said first metric.

27. The image noise reduction method of claim 25 wherein the first metric is an indication of the spatial uniformity of a local region of the input image data.

28. The image noise reduction method of claim 25 wherein the first metric is an indication of the chromaticity of a local region of the input image data.

29. The image noise reduction method of claim 25 wherein the first metric is an indication of the chromaticity uniformity of a local region of the input image data.

30. The image noise reduction method of claim 25 wherein the first metric is an indication of the pixel visibility in a local region of the input image data and is in the form of pixel by pixel gain factors.

31. The image noise reduction method of claim 25 wherein the second noise reduced non-linear filtered image data is upscaled to a resolution that matches the resolution of the first noise reduced non-linear filtered image data.

32. The image noise reduction method of claim 25 wherein the input image data and the second noise reduced non-linear filtered image data are encoded in the red, green and blue color image format;
   noise reduced non-linear filtered image data are created for each color;
   a metric is created for each input image data color; and
   the first noise reduced non-linear filtered image data is blended with the second noise reduced non-linear filtered image data in response to the metrics.

33. The image noise reduction method of claim 25 wherein the input image data and the second noise reduced non-linear filtered image data are encoded in the YUV color image format;
   first noise reduced non-linear filtered image data are created from the input image luma channel (Y) and chroma channels (U,V) data separately;
   a metric is created for each input image data channel; and
   the first noise reduced non-linear filtered image data is blended with the second noise reduced non-linear filtered image data in response to the metrics.

34. The image noise reduction method of claim 33 wherein first noise reduced non-linear filtered chroma channel image data creation is dependent on first noise reduced non-linear filtered luma channel image data creation.

* * * * *